(12) United States Patent
Mensch et al.

(10) Patent No.: US 12,723,447 B2
(45) Date of Patent: Sep. 1, 2026

(54) HANDLE MODULE WITH ACTUATING MODULE FOR AN ELECTRONIC LOCKING SYSTEM, AND VEHICLE DOOR WITH HANDLE MODULE

(71) Applicant: Witte Automotive GmbH, Velbert (DE)

(72) Inventors: Reinaldo Mensch, Wuppertal (DE); Ralf Höhn, Velbert (DE); Karsten Steinhauer, Essen (DE)

(73) Assignee: Witte Automotive GmbH, Velbert (DE)

( * ) Notice: Subject to any disclaimer, the term of this patent is extended or adjusted under 35 U.S.C. 154(b) by 359 days.

(21) Appl. No.: 18/055,859

(22) Filed: Nov. 16, 2022

(65) Prior Publication Data

US 2023/0151649 A1 May 18, 2023

(30) Foreign Application Priority Data

Nov. 16, 2021 (DE) ..................... 10 2021 212 876.9

(51) Int. Cl.
*E05B 81/76* (2014.01)
*G01V 3/08* (2006.01)

(52) U.S. Cl.
CPC .............. *E05B 81/77* (2013.01); *G01V 3/088* (2013.01)

(58) Field of Classification Search
CPC .......... E05B 81/76; E05B 81/77; G01V 3/088
USPC ....................................................... 292/336.3
See application file for complete search history.

(56) References Cited

U.S. PATENT DOCUMENTS

| | | | | |
|---|---|---|---|---|
| 8,408,610 | B2 * | 4/2013 | Leda | E05B 85/16 292/336.3 |
| 10,132,652 | B2 * | 11/2018 | Sugiura | E05B 81/76 |
| 10,962,496 | B2 * | 3/2021 | Yamamoto | G01N 27/223 |
| 10,975,601 | B2 * | 4/2021 | Beck | E05B 85/10 |

(Continued)

FOREIGN PATENT DOCUMENTS

| | | | | |
|---|---|---|---|---|
| CN | 112523623 | A | 3/2021 | |
| DE | 102020122424 | A1 * | 3/2021 | E05B 77/34 |
| WO | 2014113542 | A1 | 7/2014 | |

OTHER PUBLICATIONS

European Patent Office, Extended European Search Report in Application No. EP22207717, dated Mar. 17, 2023, 7 pages, Munich Germany.

(Continued)

*Primary Examiner* — Kristina R Fulton
*Assistant Examiner* — James Edward Ignaczewski
(74) *Attorney, Agent, or Firm* — Marshall & Melhorn, LLC

(57) ABSTRACT

A handle module may have at least one actuating module for triggering a switching function. The actuating module may be designed as a capacitive actuating sensor and may have two or more capacitive auxiliary electrodes for detecting secondary signals. The actuating module may also have a capacitive main electrode for detecting an actuation path. And, the actuating module may also have an electronic evaluation unit which is connected to the auxiliary electrodes and the main electrode. The evaluation unit may be configured to trigger or block a switching signal for the switching function as a function of the detected signals of the auxiliary electrodes and the detected signal of the main electrode.

13 Claims, 3 Drawing Sheets

(56) References Cited

U.S. PATENT DOCUMENTS

| | | | | |
|---|---|---|---|---|
| 2003/0122556 | A1* | 7/2003 | Sueyoshi | E05B 85/16 324/686 |
| 2017/0214400 | A1* | 7/2017 | Koresawa | G01D 5/2405 |
| 2017/0235008 | A1* | 8/2017 | Guibbert | H03K 17/955 324/679 |
| 2018/0209182 | A1 | 7/2018 | Beck et al. | |
| 2019/0072415 | A1* | 3/2019 | Lesák | H03K 17/9622 |
| 2020/0232262 | A1* | 7/2020 | Marlia | B60R 25/01 |
| 2020/0362604 | A1 | 11/2020 | Jarnicki et al. | |
| 2020/0392769 | A1* | 12/2020 | Nakamura | H03K 17/9622 |

OTHER PUBLICATIONS

China National Intellectual Property Administration, Office Action in Application No. 202211433009.2, dated Dec. 23, 2024, 11 pages.

* cited by examiner

HANDLE MODULE WITH ACTUATING MODULE FOR AN ELECTRONIC LOCKING SYSTEM, AND VEHICLE DOOR WITH HANDLE MODULE

FIELD

The invention relates to a handle module having an actuating module for an electronic locking system, in particular for unlocking, locking, opening and/or closing the electronic locking system, in particular an electronic lock of a movable vehicle element, in particular a vehicle door. Furthermore, the invention relates to a vehicle door having such a handle module with an actuating module.

BACKGROUND

Handle modules are known, for example, on vehicle doors, tailgates, or engine hoods. These are usually provided with a handle element which may be pivoted outwards in order to be able to open the vehicle door, the tailgate, or the engine hood. Handle modules can comprise electronic sensor modules for opening or closing a lock of the door.

SUMMARY

The object of the invention is to specify a handle module which is improved over the prior art and which has an actuating module, and a vehicle door having such an improved handle module.

The objects are achieved in accordance with the invention by a handle module and by a vehicle door having the features of the claims.

Further refinements of the invention are the subject matter of the dependent claims.

The handle module according to the invention comprises at least one actuating module for triggering a switching function, wherein the actuating module is designed as an actuating sensor, in particular a capacitive actuating sensor, and comprises at least two or more—in particular, capacitive—auxiliary electrodes for detecting secondary signals, a—in particular, capacitive—main electrode for detecting an actuation path, and an electronic evaluation unit which is connected to the auxiliary electrodes and to the main electrode, wherein the evaluation unit is configured, for the switching function, to trigger or to block a switching signal as a function of the detected signals of the auxiliary electrodes and the detected signal of the main electrode.

The invention ensures that a switching function is triggered only when switching is in fact desired. The main electrode serves to detect a desired actuation for executing a switching function. The auxiliary electrodes serve to check whether an actuation has actually been carried out, or a faulty actuation has occurred. The auxiliary electrodes are designed, for example, as a capacitive proximity sensor with low sensitivity or as a sensor for measuring electrical field strength. The auxiliary electrodes serve as compensation electrodes or verification electrodes to prevent undesired switching, for example due to contamination, dew, moisture, rain, snow or the like.

The main electrode (also called the primary electrode) is designed, for example, as a capacitive pressure sensor or actuating sensor. The main electrode detects a mechanical actuation. For example, a movable metal sheet in the same size can be arranged as a counter electrode at a distance from the main electrode and above the latter. The metal sheet is moved in the direction of the main electrode during actuation. A resulting signal is supplied to the evaluation unit. The evaluation unit is configured to trigger a switching function if the signal of the main electrode detects an actuation path of, at minimum, 0.01 mm, and the signals of all auxiliary electrodes do not detect any value, or detect a value of 1 μm to 2 μm. Furthermore, the evaluation unit can be configured to block a switching function if the signal of the main electrode detects an actuation path of at least 0.01 mm, and the signals of all auxiliary electrodes detect a value of greater than 5 μm.

Preferably, the actuating module is designed as a metal-over-capacitive touch sensor module (MOC sensor for short).

For example, the auxiliary electrodes and the main electrode are arranged as metal surfaces on a printed circuit board of the handle module. The auxiliary electrodes as capacitive proximity sensors can be arranged, for example, as plate capacitors on the circuit board. The auxiliary electrodes, as electric field meters, can be arranged, for example, as two metal electrodes on the printed circuit board. Electric fields generate microcurrents between the metal electrodes, which are measured and relayed to the evaluation unit. The auxiliary electrodes, as a capacitive proximity sensors, can be designed, for example, as an active sensor electrode with an active electric field, wherein an electrical capacitance of the electric field (change of the electric field) is detected between the sensor electrode and a counter potential, for example a hand of an approaching user, or incoming rain or incoming snow.

The main electrode, as a capacitive pressure sensor, comprises for example a stationary metal surface on the printed circuit board and a movable actuating element (also called a movable sensor element or metal sheet). The movable actuating element is arranged opposite and spaced apart from the main electrode, in particular the stationary metal surface. For example, the movable actuating element is designed as a spring plate or metal sheet. The metal sheet preferably has the same size as the main electrode.

The actuating module can be arranged on an inner handle side or outer handle side of the handle module. The handle module is designed, for example, as an outer door handle module.

The actuating module for an electronic locking system comprises at least one capacitive actuating sensor, in particular a force-controlled capacitive actuating sensor (also referred to as the main electrode or primary electrode), for executing a switching function, for example for unlocking and opening the electronic locking system, and an electronic evaluation unit which is connected to the capacitive actuating sensor, wherein an actuation path of an actuating element or trigger element can be determined by means of the electronic evaluation unit on the basis of a detected change in capacitance of the capacitive actuating sensor, wherein the capacitive actuating sensor and the evaluation unit are designed such that, in the event that an actuation path of less than 0.5 mm, in particular in a range of from 0.01 mm to 0.4 mm, for example from 0.01 mm to 0.2 mm, is determined, a trigger signal for executing the switching function is generated.

In particular, the capacitive actuating sensor and the electronic evaluation unit are configured such that a minimum actuation path or triggering path of 0.01 mm or greater, in particular in a range of 0.01 mm to 0.5 mm, in particular of 0.01 mm to 0.4 mm or 0.01 mm to 0.2 mm, can be detected.

For example, the measured values for the change in capacitance are detected with the resolution, and processed by means of the evaluation unit, that allows for detecting a minimum actuation path or triggering path of 0.01 mm or greater, and at most 0.4 mm.

For this purpose, the electronic evaluation unit comprises an analog-to-digital converter and a microprocessor, wherein the analog-to-digital converter is provided for converting the detected changes in capacitance into digital values, and the microprocessor is provided for processing the digital values and for generating the trigger signal.

The analog-to-digital converter is preferably designed as a 16-bit converter, a 24-bit converter or 32-bit converter. As a result, small deformations of the actuating sensor—and a resulting minimal capacitance change and resulting very small actuation paths or triggering paths—can be detected, wherein a deformation of the actuating element or triggering element of 0.01 mm (actuating or triggering stroke) is detected, and therefore a triggering signal can be generated for a detected deformation of only 0.01 mm.

In one possible embodiment, the capacitive actuating sensor comprises a plurality of electrodes, in particular flat electrodes, which are aligned with one another and are arranged at a distance from one another.

Each electrode has in particular a prespecified capacitance, and is connected to the evaluation unit which detects changes in the capacitance of the respective electrodes. One of the electrodes is a main electrode, and the other electrodes are auxiliary electrodes.

The evaluation unit is in particular configured to monitor all electrodes together in such a manner that changes in the capacitances of the plurality of auxiliary electrodes and changes in the capacitance of the main electrode are detected and compared with one another, and/or compared with prespecified reference values. According to the detected signals, a switching function is triggered (or allowed) or blocked by means of the evaluation unit.

In particular, the actuating module is designed as a so-called MOC module (metal-over-cap module) in which the metallic sensor components located on the inside are encapsulated from the outside.

The actuating module is arranged in a handle module of a movable vehicle element such as a door or tailgate.

The invention enables a compact construction of the handle module and small actuating strokes of the actuating module, in particular of less than 0.4 mm, for example in a range of from 0.01 mm to 0.3 mm. In addition, the actuation forces can be set; in particular, threshold values can be specified. Due to the detection of actuating strokes of less than 0.4 mm, the actuating module can dispense with foaming or elastomers.

DESCRIPTION OF THE FIGURES

Embodiments of the invention are explained in greater detail with reference to the drawings, in which.

Parts corresponding to one another are provided with the same reference signs in all the drawings.

DETAILED DESCRIPTION

Figure 1:
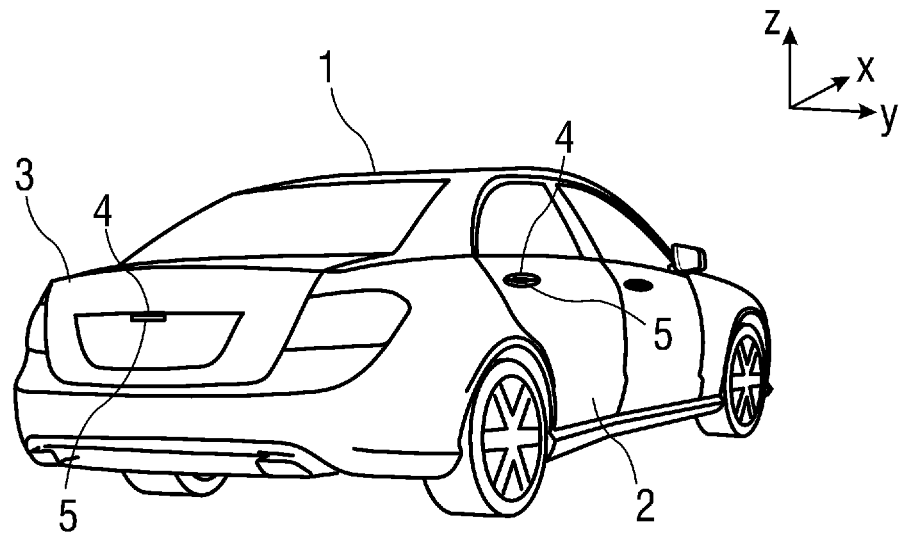
FIG. 1 is a perspective view of a vehicle having a handle module arranged on the outside with an integrated actuating module.

FIG. 1 is a schematic illustration of a vehicle 1. The vehicle 1 has a plurality of electronically switchable regions on its outer side. For example, the vehicle 1 has, in the region of a door 2 or a tailgate 3, a handle module 5 with an integrated actuating module 4 for an electronic locking system, in particular for unlocking, locking, opening and/or closing the electronic locking system, in particular an electronic lock, the door 2 or the tailgate 3. In particular, the actuating module 4 serves to detect at least one manual actuation of the handle module 5 by a hand of a user.

The actuating module 4 can be arranged, in particular integrated, in the handle module 5 of the door 2 or the tailgate 3. The handle module 5 is, for example, an outer handle module. The actuating module 4 can be integrated on an inner handle side 5.1 and/or an outer handle side 5.2 of the handle module 5 (shown in FIG. 7).

The actuating module 4 enables the activation of a corresponding function of the vehicle 1 in a simple manner, such as opening or closing the door 2, unlocking or locking of a tailgate lock or hood lock, or opening or closing the tailgate 3. For this purpose, the vehicle 1 can be equipped with a plurality of actuating modules 4. At least one or more actuating modules 4 can be provided for and integrated into each handle module 5.

Figure 2:
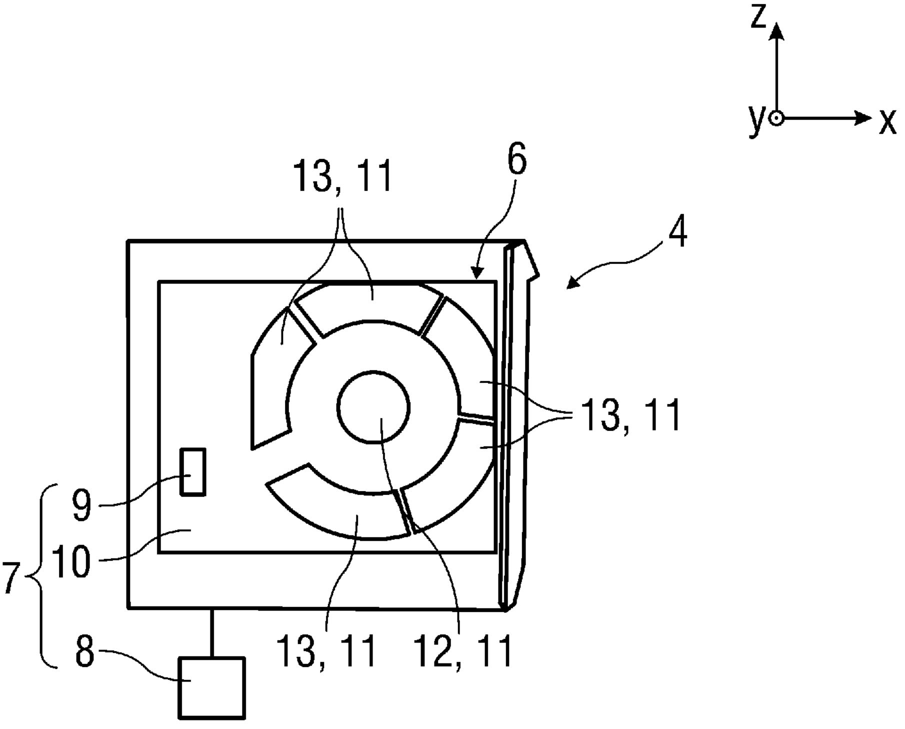
FIG. 2 is a schematic illustration of a first exemplary embodiment of an actuating module, FIG. 3 schematically shows a handle module with an integrated actuating module according to FIG. 2.

FIG. 2 shows a schematic illustration of a first exemplary embodiment of the actuating module 4.

The actuating module 4 comprises at least one capacitive actuating sensor 6, in particular a force-controlled capacitive actuating sensor 6, for executing the switching function, for example for unlocking and opening the electronic locking system.

The actuating module 4 also comprises an electronic evaluation unit 7 (also referred to as an electronic unit).

The electronic evaluation unit 7 is connected to the capacitive actuating sensor 6 at least for the transmission of signals. In this case, by means of the electronic evaluation unit 7, an actuation path of an actuating element or triggering element (also referred to as movable sensor element 6.1), in particular an actuation path traveled from the pressure of the hand of the user on the actuating module 4, can be determined by means of a detected change in capacitance of the capacitive actuating sensor 6.

The capacitive actuating sensor 6 and the electronic evaluation unit 7 are configured such that, in the event that an actuation path of less than 0.5 mm, in particular in a range of from 0.01 mm to 0.4 mm, for example from 0.01 mm to 0.2 mm is determined, a trigger signal for performing a function of the vehicle 1, in particular a switching function of the electronic locking system, for example a trigger signal for unlocking and opening the electronic locking system, is generated.

In particular, the capacitive actuating sensor 6 and the electronic evaluation unit 7 are configured such that a minimum actuation path or triggering path of 0.01 mm or greater, in particular in a range of 0.01 mm to 0.5 mm, in particular of 0.01 mm to 0.4 mm or 0.01 mm to 0.2 mm, can be detected.

For example, the measured values for the change in capacitance are detected with the resolution, and processed by means of the electronic evaluation unit 7, that allows for detecting a minimum actuation path or triggering path of 0.01 mm or greater, at most 0.4 mm.

For this purpose, the electronic evaluation unit 7 comprises an analog-to-digital converter 8 and a microprocessor 9.

The microprocessor 9 is part of a printed circuit board 10 which is arranged in the actuating module 4.

The analog-to-digital converter 8 is designed for high resolution as a 16-bit converter, 24-bit converter or 32-bit converter, and is arranged outside the actuating module 4. The actuating sensor 6 arranged in the actuating module 4 and the microprocessor 9 are connected to the external analog-to-digital converter 8. The analog-to-digital converter 8 is arranged, for example, in the handle module 5 or in the vicinity of the actuating module 4, in particular adjacent thereto.

Depending on the size of the analog-to-digital converter 8, the latter may also be arranged on the printed circuit board 10 in the actuating module 4.

The analog-to-digital converter 8 is provided for converting the detected changes in capacitance into digital values, and the microprocessor 9 is provided for processing the digital values and for generating the trigger signal for the function, in particular a switching function.

Due to the formation of the analog-to-digital converter 8 as a converter with high resolution, small deformations of the actuating element or triggering element can be determined on the basis of the very small capacitance changes of the capacitive actuating sensor 6—and thus, very small actuation paths or triggering paths—detected with high resolution. In this case, a deformation of the actuating element or triggering element of the actuating module 4 of 0.01 mm (the actuating or triggering stroke) can be detected—and therefore, a triggering signal can be generated by means of the electronic evaluation unit 7, in particular by means of algorithms of the microprocessor 9—for a detected deformation of only 0.01 mm.

In one possible embodiment, the capacitive actuating sensor 6 comprises a plurality of electrodes 11, in particular flat electrodes, which are aligned with one another and are arranged at a distance from one another.

Each electrode 11 has, in particular, a prespecified capacitance, and is connected to the electronic evaluation unit 7 which detects changes in the capacitance of the respective electrodes 11. One of the electrodes 11 is a main electrode 12, and the other electrodes 11 are auxiliary electrodes 13.

The main electrode 12 serves to determine the actuation path or triggering path on the basis of detected changes in capacitance.

The auxiliary electrodes 13 (also called safety electrodes) are used to determine environmental influences such as rain, snow, or hail based on detected changes in capacitance.

The electronic evaluation unit 7 is configured in particular to monitor all electrodes 11 together in such a way that changes in the capacitances of the plurality of auxiliary electrodes 13, for example due to the proximity of and/or contact with dirt, moisture, rain, snow or the like, and changes in the capacitance of the main electrode 12, for example due to touch and/or actuation in the millimeter range, are detected and compared with one another and/or compared with prespecified reference values.

For reliable triggering or reliable blocking a switching function, such as an unlocking function or locking function, when a touch of the actuating module 4 is identified by means of an actuating element in the region of the main electrode 12, the surroundings of the main electrode 12 are monitored by means of the auxiliary electrodes 13.

When a touch of the main electrode 12 is reliably detected, a control signal is then triggered, for example by means of the evaluation unit 7, which controls a corresponding function such as a closing function, opening function, unlocking function or locking function—for example, triggers or blocks said function.

In this case, the evaluation unit 7 is configured to trigger a switching signal or control signal, or to block such a triggering of a switching or control signal as a function of the determined changes in the capacitance of the main electrode 12 and/or auxiliary electrodes 13.

In the first exemplary embodiment, the capacitive actuating sensor 6 comprises the capacitive main electrode 12 and the plurality of auxiliary electrodes 13. The two or more capacitive auxiliary electrodes 13 detect secondary signals. The capacitive main electrode 12 detects the actuation path as the primary signal. Both the main electrode 12 and the auxiliary electrodes 13 are connected to the evaluation unit 7. The evaluation unit 7 is configured to trigger or block a switching signal for a switching function as a function of the detected signals of the auxiliary electrodes 13 and the detected signal of the main electrode 12.

For example, the evaluation unit 7 is configured to trigger a switching function if the signal of the main electrode 12 detects an actuation path of, at a minimum, 0.01 mm, and the signals of all the auxiliary electrodes 13 detect no value, or a value of 1 μm to 2 μm.

In addition, the evaluation unit 7 can be configured to block a switching function if the signal of the main electrode 12 detects an actuation path of, at minimum, 0.01 mm, and the signals of all auxiliary electrodes 13 detect a value of greater than 5 μm.

For example, the evaluation unit 7 can be implemented as algorithms of the microprocessor 9 on the printed circuit board 10.

The electrodes 11 are in particular flat electrodes, for example strip electrodes, circular electrodes and/or rectangular electrodes. By way of example, the auxiliary electrodes 13 have greater dimensions than the main electrode 12.

In the exemplary embodiment, the auxiliary electrodes 13 are designed as arc-shaped strip electrodes. However, the auxiliary electrodes 13 can also have a different suitable shape.

The auxiliary electrodes 13 are each arranged adjacent to the main electrode 12, in particular distributed around the main electrode 12 in a circle and arranged at a distance therefrom.

The auxiliary electrodes 13 serve in particular to monitor the surroundings of the main electrode 12. For example, faulty signals which are caused, for example, by an influence, in particular a mechanical load or contact with dust, rain or dirt, are detected by means of the auxiliary electrodes 13, and an incorrect triggering is suppressed because the function triggered as a result of a detected actuation of the main electrode 12 with the minimum actuating stroke of 0.01 mm or greater is blocked or suppressed.

Furthermore, the actuating module 4 can be designed as a so-called MOC module (metal-over-cap module) in which the inner metallic sensor components, in particular the electrodes 11, and thus the capacitive actuating sensor 6, are encapsulated from the outside.

When the handle module 5 or on another suitable component of the door 2 or the tailgate 3 is in an installed state, a force, for example a pressure force on an outer handle side 5.2 (shown in FIGS. 3 and 7) is applied to the actuating sensor 6 of the actuating module 4.

Figure 3:
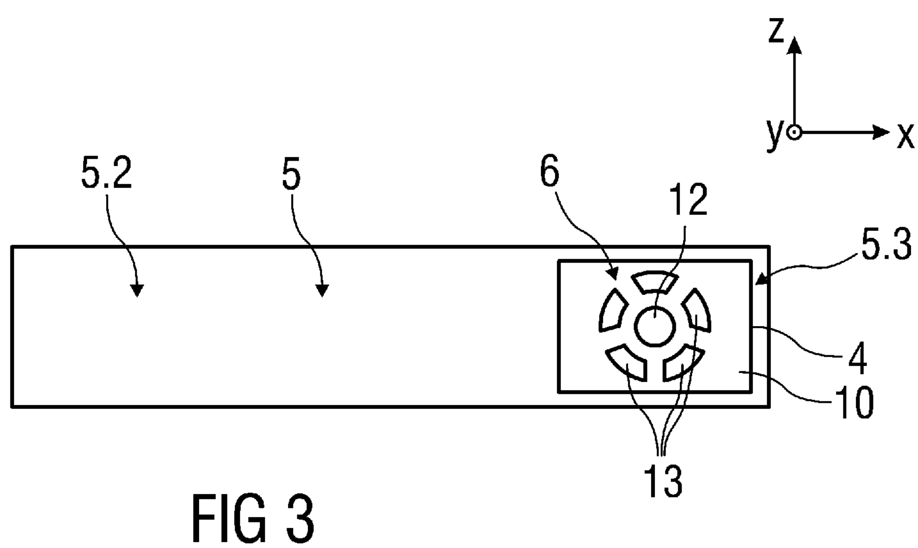

FIG. 3 shows the handle module 5 in plan view, by way of example. The actuating module 4 with its actuating sensor 6 with the main electrode 12 and the auxiliary electrodes 13 is integrated on the printed circuit board 10, which is integrated, for example, on one of the surfaces, for example the outer handle side 5.2 of the handle module 5, on a longitudinal end 5.3.

Figure 4:
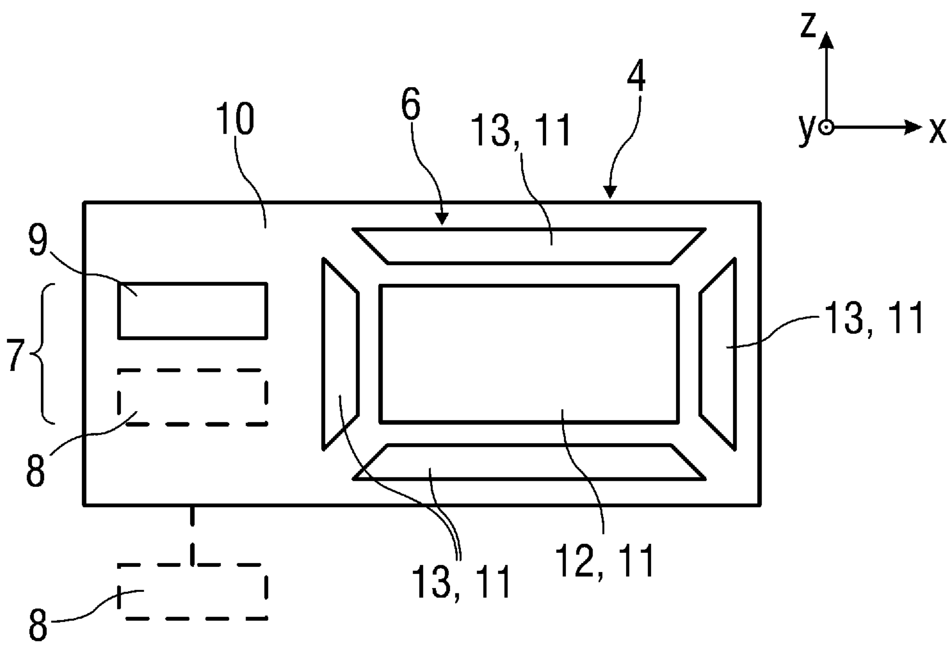
FIG. 4 is a schematic illustration of a second exemplary embodiment of an actuating module.

FIG. 4 shows a second exemplary embodiment of the actuating module 4, with a central main electrode 12 and the auxiliary electrodes 13 arranged distributed around it, as the actuating sensor 6. Instead of circular electrodes 11, the electrodes 11 of the second exemplary embodiment designed as flat electrodes are designed rectangular. For example, the main electrode 12 is designed rectangular. The auxiliary electrodes 13 are designed trapezoidal and are arranged distributed around the main electrode 12. The electrodes 11 are arranged and integrated on the printed circuit board 10. The electrodes 11 are connected to the electronic evaluation unit 7, in particular for the transmission of signals. The evaluation unit 7 can comprise the analog-to-digital converter 8. This analog-to-digital converter 8 may be part of the printed circuit board 10 or another electronic unit of the door 2 of the vehicle 1.

The mode of operation of the actuating sensor 6 according to the first and second exemplary embodiments is identical. The actuating sensors 6 differ only in the number and the shape of the auxiliary electrodes 13 and the main electrode 12.

The following mode of operation applies to both exemplary embodiments.

By way of example, a change in capacitance due to an actuating stroke is detected by means of the main electrode 12. If the force exceeds a specified threshold value of 0.01 mm, for example, this is identified as an opening request, and the door lock is safely unlocked.

The triggering of the unlocking can, for example, then be carried out by pressing the handle module 5 on the outer handle side 5.2 against an actuating surface of the actuating module 4 in the direction of the vehicle body, such that the actuating surface is pressed from the outside into the handle interior, or alternatively the inner handle side 5.1 is pressed outward away from the vehicle body against an actuating surface of the actuating module 4, such that the actuating surface is pressed from the inside into the handle interior.

Figure 5:
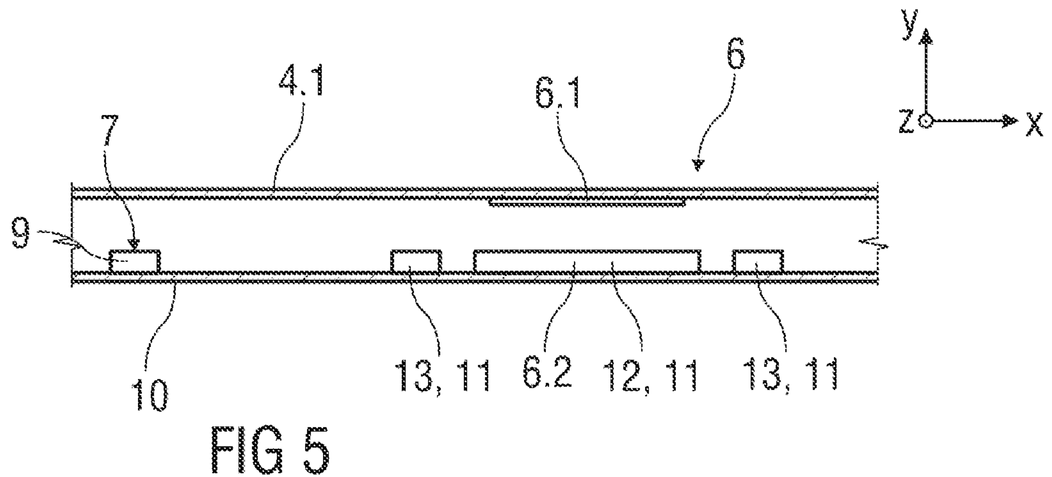
FIG. 5 is a further schematic illustration of the second exemplary embodiment for the actuating module according to FIG. 4, FIG. 6 schematically shows a handle module with the integrated actuating module according to FIGS. 4 and 5.

FIG. 5 shows the actuating sensor 6 in a sectional view. The evaluation unit 7 with the microprocessor 9 and the auxiliary electrodes 13, and with the fixed electrode 11 of the main electrode 12, are arranged, in particular soldered, on the printed circuit board 10.

Upon a sufficiently large actuating stroke or triggering path into the handle interior from the outer handle side 5.2 and/or the inner handle side 5.1, the actuating surface entrains a movable sensor element 6.1 (also referred to as actuating element or trigger element; shown in greater detail in FIG. 5), in particular a spring plate or a metal spring, and also presses it into the inner handle. As a result, the distance to a fixed sensor element 6.2, the electrodes 11, in particular the main electrode 12, for example a metal layer, for example a copper layer on a surface of the printed circuit board 10 of the evaluation unit 7, is changed and, when a prespecified threshold value is exceeded, an opening signal is generated by the evaluation unit 7 as the trigger signal and, for example, the door lock is unlocked or a door movement is stopped.

The fixed sensor element 6.2, in particular the electrodes 11 can, for example, be arranged directly on a surface of the printed circuit board 10 or electronics of the evaluation unit 7. The movable sensor element 6.1, in particular an actuating element or triggering element (illustrated in more detail in FIG. 5) can be arranged in a receiving opening of a module housing 4.1 of the actuating module 4. In this case, the movable sensor element 6.1 is arranged in particular at a distance from the fixed sensor element 6.2, the electrodes 11. The module housing 4.1 and the movable sensor element 6.1 encapsulate the fixed sensor element 6.2, the electrodes 11, located on the inside from the outside. The sensor housing 4.1 is in particular a plastic housing and can be molded, in particular injection molded, onto the printed circuit board 10 or the electronics.

Figure 6:
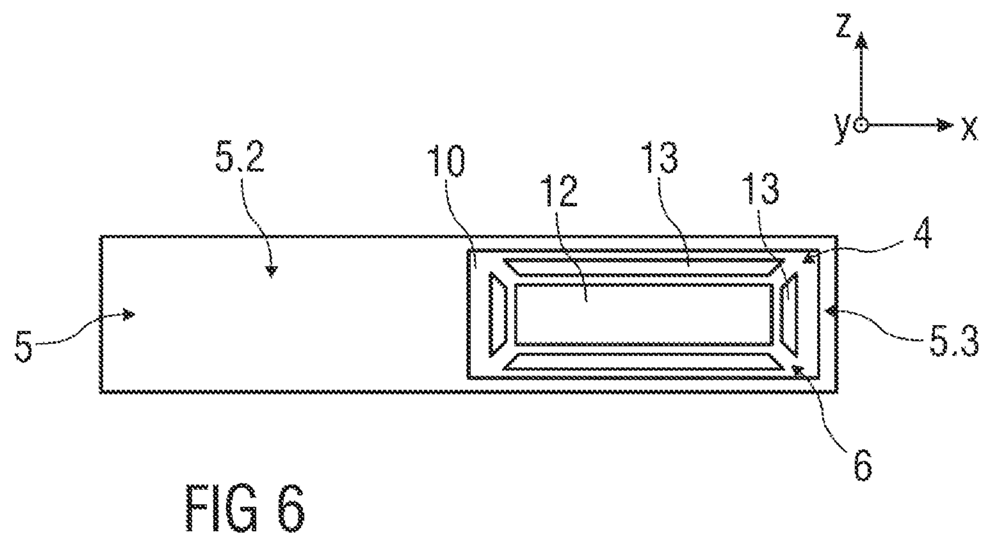

FIG. 6 shows schematically the handle module 5 with the integrated actuating module 4 according to FIGS. 4 and 5. FIG. 5 shows, by way of example, the handle module 5 in plan view. The actuating module 4 with its actuating sensor 6 with the main electrode 12 and the auxiliary electrodes 13 is integrated on the printed circuit board 10, which is integrated, for example, on one of the surfaces, for example the outer handle side 5.2 of the handle module 5, on a longitudinal end 5.3.

Figure 7:
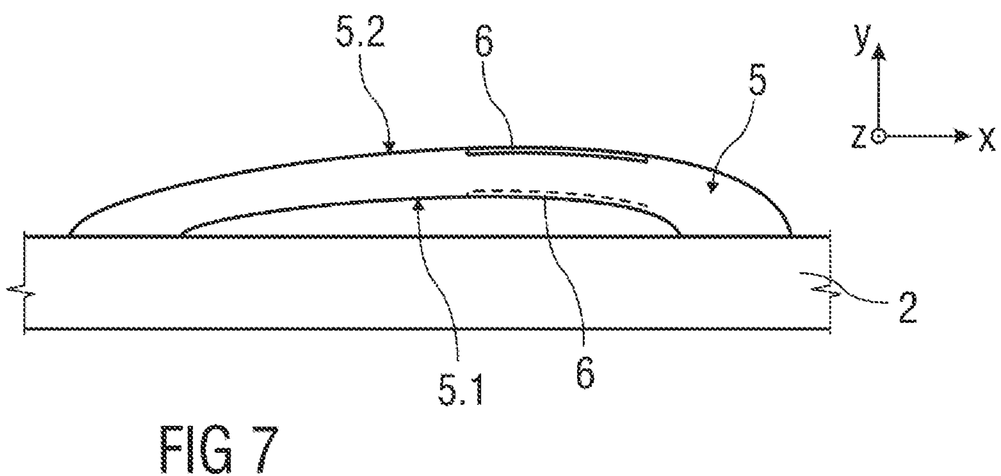
FIG. 7 is a schematic illustration of a handle module as an outer door handle module with an integrated actuating module.

FIG. 7 shows a schematic illustration of the handle module 5 as an door outer handle module with an integrated actuating module 4. The handle module 5 is curved and comprises the inner handle side 5.1 and the outer handle side 5.2. The actuating sensor 6 can be implemented on the surface on the inner handle side 5.1 and/or the outer handle side 5.2.

The invention enables a compact design of the actuating module 4 and small actuating strokes, in particular of less than 0.4 mm, for example in a range from 0.01 mm to 0.3 mm. In addition, the actuation forces can be set; in particular, threshold values can be specified. Due to the detection of actuating strokes of less than 0.4 mm, the actuating module 4 can have a particularly low structural height, so that foaming or elastomers can be dispensed with.

LIST OF REFERENCE SIGNS

1 Vehicle
2 Door
3 Tailgate
4 Actuating module
4.1 Module housing
5 Handle module
5.1 Inner handle side
5.2 Outer handle side
5.3 Longitudinal end
6 Actuating sensor
6.1 Movable sensor element
6.2 Fixed sensor element
7 Electronic evaluation unit
8 Analog-to-digital converter
9 Microprocessor
10 Printed circuit board
11 Electrode
12 Main electrode
13 Auxiliary electrode

What is claimed is:

1. A handle module comprising at least one actuating module for triggering a switching function, wherein the actuating module is designed as a capacitive actuating sensor, and comprises:

two or more auxiliary electrodes for detecting secondary signals, a stroke-sensing main electrode for detecting an actuation path, and an electronic evaluation unit which is connected to the auxiliary electrodes and the stroke-sensing main electrode, wherein the evaluation unit is configured to trigger or block a switching signal for the switching function as a function of the detected signals of the auxiliary electrodes and the detected signal of the stroke-sensing main electrode, wherein the at least one actuating module is a metal-over-capacitive touch sensor module, wherein a movable sensor element is provided which is arranged opposite and spaced apart from the stroke-sensing main electrode, which is fixed, wherein the movable sensor element has a first surface in direct facing contact with a module housing, and an opposite second surface directly above or below a first surface of the fixed stroke-sensing main electrode, wherein the auxiliary electrodes are arranged surrounding each side of the fixed stroke-sensing main electrode and the movable sensor element is arranged laterally offset to the auxiliary electrodes so that the movable sensor element does not laterally overlap the auxiliary electrodes.

2. The handle module according to claim 1, wherein the evaluation unit is configured to trigger a switching function if the signal of the main electrode detects an actuation path of at least 0.01 mm, and the signals of all auxiliary electrodes have no value.

3. The handle module according to claim 2, wherein the evaluation unit is configured to block a switching function if the signal of the main electrode detects an actuation path of at least 0.01 mm, and the signals of all auxiliary electrodes detect a value of greater than 5 μm.

4. The handle module according to claim 1, wherein the auxiliary electrodes and the main electrode are arranged as metal surfaces on a printed circuit board.

5. The handle module according to claim 4, wherein the fixed main electrode has a second surface in direct facing contact with the printed circuit board.

6. The handle module according to claim 5, wherein the movable sensor element is designed as a spring plate or metal sheet.

7. The handle module according to claim 1, wherein the actuating module is arranged on an inner handle side and/or outer handle side.

8. The handle module according to claim 1, wherein the handle module is designed as a door outside handle module.

9. A vehicle door with a handle module according to claim 1.

10. The handle module according to claim 1, wherein the handle module houses the moveable sensor element, the main electrode and the auxiliary electrodes.

11. The handle module according to claim 1, wherein a second surface of the fixed main electrode, opposite the first surface, is directly affixed to an outer surface of the handle module.

12. The handle module according to claim 1, wherein the main electrode is a path sensor element configured to determine the actuation path by monitoring changes in millimeters due to actuation of the main electrode in comparison with predetermined stroke reference values.

13. The handle module according to claim 1, wherein the movable sensor element is attached to the first surface of the module housing and the main electrode is soldered to a printed circuit board on a second surface of the handle module, spaced apart from the first surface of the module housing, in the handle module.

* * * * *